United States Patent
Sornin

(10) Patent No.: US 8,565,708 B2
(45) Date of Patent: Oct. 22, 2013

(54) REJECTION OF INTERFERERS

(75) Inventor: Nicolas Sornin, La Tronche (FR)

(73) Assignee: Cambridge Silicon Radio Limited, Cambridge (GB)

(*) Notice: Subject to any disclaimer, the term of this patent is extended or adjusted under 35 U.S.C. 154(b) by 125 days.

(21) Appl. No.: 12/992,400

(22) PCT Filed: Apr. 7, 2009

(86) PCT No.: PCT/EP2009/054134
§ 371 (c)(1),
(2), (4) Date: Dec. 29, 2010

(87) PCT Pub. No.: WO2009/144068
PCT Pub. Date: Dec. 3, 2009

(65) Prior Publication Data
US 2011/0299580 A1    Dec. 8, 2011

(30) Foreign Application Priority Data

May 29, 2008 (GB) .................................. 0809790.9

(51) Int. Cl.
*H04B 1/10* (2006.01)
(52) U.S. Cl.
USPC ....... 455/307; 455/63.1; 455/323; 379/29.01; 379/93.01; 379/398
(58) Field of Classification Search
USPC ....................................... 455/307
See application file for complete search history.

(56) References Cited

U.S. PATENT DOCUMENTS

| 4,267,605 A | 5/1981 | Matsuzawa et al. |
| 5,570,350 A | 10/1996 | Myer et al. |
| 5,881,362 A * | 3/1999 | Eldering et al. ............... 725/125 |
| 7,995,685 B2 * | 8/2011 | Wang et al. .................... 375/346 |
| 2001/0040932 A1 * | 11/2001 | Lindquist et al. ............. 375/346 |

(Continued)

FOREIGN PATENT DOCUMENTS

| DE | 4220228 A | 4/1994 |
| EP | 0372369 A | 6/1990 |
| GB | 2288936 A | 11/1995 |
| WO | 00/46929 A | 8/2000 |

*Primary Examiner* — Ajibola Akinyemi
(74) *Attorney, Agent, or Firm* — Novak Druce Connolly Bove + Quigg LLP; Vincent M DeLuca

(57) ABSTRACT

A filter for filtering a received signal to attenuate an interferer therein, the interferer having a component at an interferer frequency, and the filter comprising: an intermediate filter providing a passband and a stopband; a first frequency converter configured to form a first intermediate signal by frequency-shifting an input signal derived from the received signal such that a component of the input signal at the interferer frequency is shifted to a frequency in the passband of the intermediate filter, and to input the first intermediate signal to the intermediate filter so as to cause the first intermediate signal to be filtered by the intermediate filter to form a second intermediate signal; a second frequency converter configured to form a cancellation signal by frequency-shifting the second intermediate signal such that a component of the second intermediate signal in the passband of the intermediate filter is shifted to the interferer frequency; and a cancellation unit configured to cancel the cancellation signal from the received signal to attenuate the interferer therein.

12 Claims, 2 Drawing Sheets

(56) References Cited

U.S. PATENT DOCUMENTS

| | | | |
|---|---|---|---|
| 2003/0076946 A1* | 4/2003 | Dziawa et al. | 379/398 |
| 2003/0169116 A1* | 9/2003 | Manku et al. | 331/57 |
| 2003/0216122 A1* | 11/2003 | Cordone et al. | 455/63.1 |
| 2005/0226356 A1 | 10/2005 | Pirzada et al. | |
| 2006/0160518 A1* | 7/2006 | Seendripu et al. | 455/323 |
| 2006/0164554 A1 | 7/2006 | Wang et al. | |
| 2007/0239437 A1 | 10/2007 | Kim | |
| 2010/0177857 A1* | 7/2010 | Huttunen et al. | 375/350 |

* cited by examiner

REJECTION OF INTERFERERS

This invention relates to the rejection of interferers in signal receivers.

FIG. 1 is a schematic diagram of a typical radio receiver. The receiver comprises an antenna 1 which receives a radio signal. The output of the antenna passes via an optional filter 2 to a low noise amplifier (LNA) 3 which amplifies the received signal. The output of the amplifier passes via a second optional filter 4 to a mixer 5. The mixer 5 mixes the received signal with a signal from a local oscillator (LO) 6 to downconvert the signal of interest to a desired frequency band. There may be multiple downconversion stages. The output of the downconversion process is digitised by an analogue-to-digital (A-to-D) converter 7 and passed to a baseband processor 8 which performs baseband processing of the signal. In many receivers there are two mixers (for I and Q) in parallel.

When a receiver is operating, the reception conditions may be such that there is a strong interferer outside the bandwidth of the signal of interest. For example, a UWB receiver could be subjected to interference from a nearby GSM transmitter. The section of the receiver up to the first mixer stage is known as the front end. It is highly advantageous for a radio front end to be capable of yielding an output from which the signal of interest can be discerned even when there is a strong interferer outside the bandwidth of the signal of interest. In theory, an out-of-band interferer could be filtered out after the incoming signal has been downconverted. If the signal of interest is weak then it would normally be desirable to amplify it strongly by means of the amplifier 3 so as to improve the signal's immunity to noise that might be introduced during the mixing stage, and so that the signal can be detected well by the A-to-D converter. However, the interferer could be much stronger than the signal of interest and applying strong amplification to both the interferer and the wanted signal could result in the amplifier or the mixer being saturated. For this reason, a receiver's sensitivity to a wanted signal in the presence of an interferer is limited by the ability of the components of the front end to resist saturation at high levels of amplification.

In a typical modern receiver the mixer becomes saturated before the LNA; in other words, the mixer is saturated at a lower level of amplification than the level that causes the LNA to be saturated. The mixer is therefore a compression point which limits the maximum permissible gain of the front end. One reason for this is that the amplification provided by the LNA inherently results in there being a greater signal amplitude at the input to the mixer than at the input to the LNA.

The available amplification can be increased in two ways:
1. by filtering the incoming signal to attenuate out of band interferers before the LNA, i.e. at the location of filter 2 in FIG. 1; and
2. by filtering the incoming signal to attenuate out of band interferers after the LNA, i.e. at the location of filter 4 in FIG. 1.

Option 1 has the disadvantage that at the location of filter 2 the incoming signal has not yet been amplified, and so if the filter has any attenuation in its passband then that could significantly impair reception of the wanted signal. In addition, this option is not always workable: for example receivers for wide-bandwidth protocols may have to cope with interferers inside the wanted band, as in the case of a UWB receiver and a Wimax interferer. Option 2 has the disadvantage that a filter at the location of filter 4 is normally implemented using off-chip components, which—if the remainder of the receiver is to be implemented on-chip—increases cost, uses additional I/O pins on the chip and calls for driving buffers to interface to the off-chip filter. Such filters can be implemented as surface acoustic wave (SAW) filters. For this reason, option 2 is normally avoided except for receivers that demand very high sensitivity, such as 3G or GPS receivers. For further information on these issues see "A Blocker Filtering Technique for SAW-Less Wireless Receivers", IEEE Journal of Solid State Circuits, December 2007.

Thus, as general objectives, it is desirable in highly cost-sensitive applications (e.g. Bluetooth receivers) to minimise the need for filters, and especially off-chip filters, and in highly performance-driven applications (e.g. 3G, UWB or GPS receivers) to either relax the specification of any filters in the receive path or to otherwise improve the tolerance of the receiver to interferers. Furthermore, in the case of UWB it is desirable to suppress in-band blockers (interferers), which conventional SAW filters cannot do because their response is fixed whereas the frequency of a blocker is not known in advance.

There is therefore a need for an improved mechanism for filtering an interferer from a signal.

According to one aspect of the present invention there is provided a filter for filtering a received signal to attenuate an interferer therein, the interferer having a component at an interferer frequency, and the filter comprising: an intermediate filter providing a passband and a stopband; a first frequency converter configured to form a first intermediate signal by frequency-shifting an input signal derived from the received signal such that a component of the input signal at the interferer frequency is shifted to a frequency in the passband of the intermediate filter, and to input the first intermediate signal to the intermediate filter so as to cause the first intermediate signal to be filtered by the intermediate filter to form a second intermediate signal; a second frequency converter configured to form a cancellation signal by frequency-shifting the second intermediate signal such that a component of the second intermediate signal in the passband of the intermediate filter is shifted to the interferer frequency; and a cancellation unit configured to cancel the cancellation signal from the received signal to attenuate the interferer therein.

The passband may be lower in frequency than the interferer frequency. The upper limit of the passband may be less than 50 MHz. The intermediate filter may be a low-pass filter.

The filter may comprise a local oscillator for generating a mixing signal. The first frequency converter may comprise a mixer configured to mix the mixing signal with the input signal to form the first intermediate signal. The second frequency converter may comprise a mixer configured to mix the mixing signal with the second intermediate signal to form the cancellation signal. The oscillator may be a ring oscillator. It may be other than a crystal oscillator.

The cancellation unit may be configured to linearly combine the received signal and the cancellation signal.

The interferer frequency may be at radio frequency.

The filter may comprise a signal strength detector configured to detect the strength of a signal at the output of the intermediate filter and to, if the detected strength is below a predetermined threshold, deactivate the filter.

According to a second aspect of the invention there is provided a signal receiver comprising: an amplifier for amplifying an incoming signal to form a received signal; a filter as set out above configured to filter the received signal to attenuate an interferer therein; and a downconverter for downconverting the filtered received signal.

The downconverter may be a mixer.

The signal receiver may comprise a detector for detecting an interferer in the received signal and activating the filter in response to detecting an interferer.

According to a third aspect of the present invention there is provided a method for notch filtering a received signal to attenuate an interferer therein, the interferer having a component at an interferer frequency, the method comprising: synthesising a cancellation signal by frequency-shifting an input signal derived from the received signal in such a way as to shift a component of the input signal at the interferer frequency to a frequency in the passband of an intermediate filter, filtering by the frequency shifted signal by means of the intermediate filter to form a second intermediate signal and forming the cancellation signal by frequency-shifting the second intermediate signal such that a component of the second intermediate signal in the passband of the intermediate filter is shifted to the interferer frequency; and cancelling the cancellation signal from the received signal to attenuate the interferer therein.

The present invention will now be described by way of example with reference to the accompanying drawings. In the drawings.

In the system to be described below, a filter circuit is used to assist in rejecting an interferer from a received signal. The filter synthesizes a signal that, when combined with the received signal, has the effect of notch filtering the received signal. When the synthesized signal is tuned so that it comprises components that correspond to the interferer, the notch of the filter encompasses the frequency of the interferer and can have the effect of attenuating the interferer. In this way the interferer can be rejected at radio frequency. The notch can be chosen to be narrow, rejecting only frequencies in the region of the interferer, in contrast to conventional filters for rejection of out-of-band interference, which reject all frequencies apart from those in the region of the signals of interest.

Figure 1:
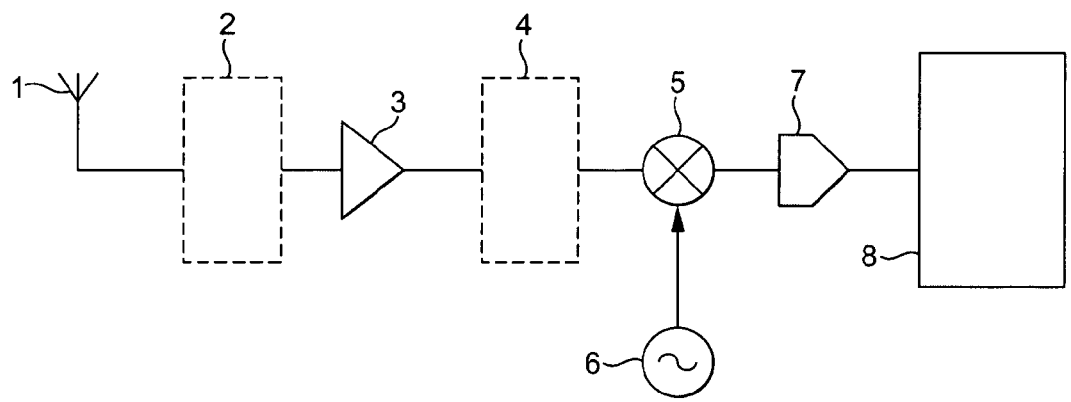
FIG. 1 is a schematic diagram of a typical radio receiver.
Figure 2:
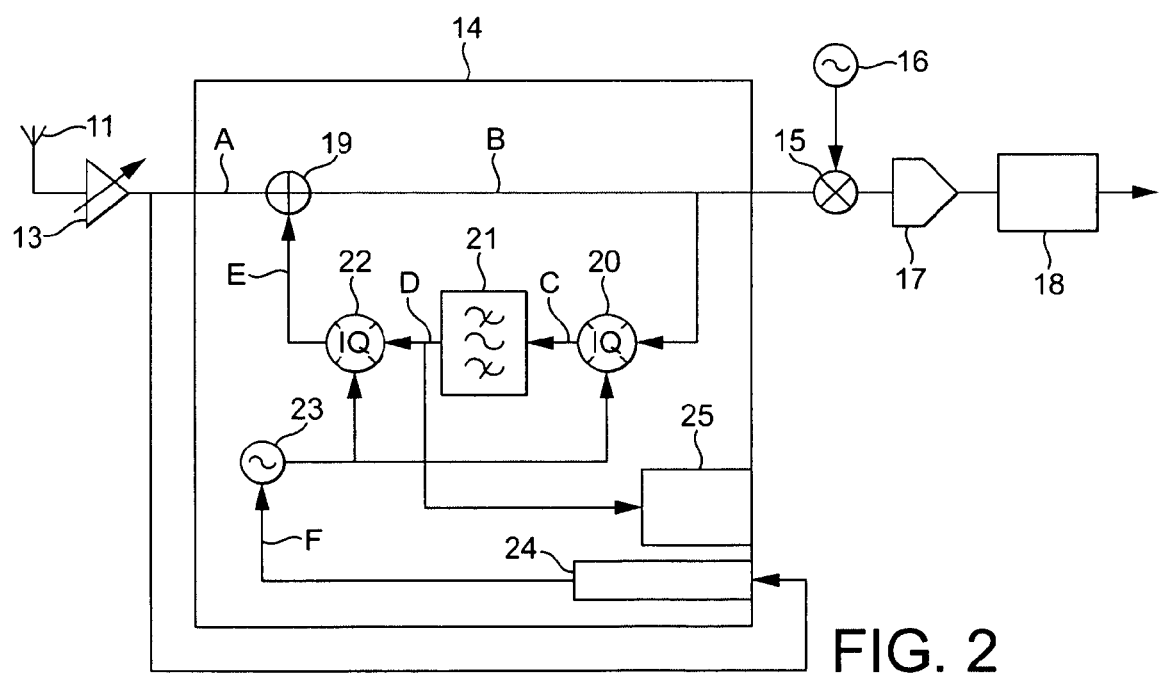
FIG. 2 is a diagram of a radio receiver having an active notch filter.

The receiver of FIG. 2 comprises an antenna 11 for receiving a radio signal. The output of the antenna passes to an amplifier 13 which amplifies the received signal. The output of the amplifier passes via a filter block 14 to a mixer 15. The mixer 15 mixes the received signal with a signal from a local oscillator 16 to downconvert the signal of interest to a desired frequency band. There may be multiple downconversion stages, but only one is shown in FIG. 2. The output of the downconversion process is digitised by an analogue-to-digital (A-to-D) converter 17 and passed to a baseband processor 18 which performs baseband processing of the signal. The baseband processor could, for example, demodulate the signal and form an output representing the traffic data carried by the received signal of interest.

The filter block 14 is intended for cancelling an interferer from the received signal. The filter block comprises a first mixing stage 20, a low pass filter 21 and a second mixing stage 22. The signal at B that is to be input to the mixer 15 is also input to the first mixing stage 20, where it is mixed with the output of a second local oscillator 23. The output of the first mixing stage is low-pass filtered by filter 21, and the output of filter 21 is mixed again with the output of the second local oscillator 23. The output of the second local oscillator 23 is subtracted by subtraction unit 19 (e.g. a differential amplifier) to the signal at A that is the output of the amplifier 13 to form the signal that is to be input to the mixer 15.

In use, when an interferer is detected at a certain frequency the second local oscillator 23 is set to operate at roughly that frequency ($f_{LO2}$). This causes the first mixing stage 20 to frequency-shift the components of the signal at B that are at $f_{LO2}$ to zero Hertz at the output (C) of the first mixing stage 20. Those components and those near them in the frequency spectrum are passed by low-pass filter 21, but other components derived from the signal at B are blocked by the filter 21. The output of the filter (at D) is then mixed again with the signal from the second LO 23. This shifts the components that were passed by the filter 21 back to their original frequencies. Therefore, the signal at E that is output by the second mixing stage has components only at frequencies in the region of $f_{LO2}$, and those components are substantially the same as the components of the signal at B at the same frequencies. As a result, when the signal at E is subtracted from the signal at A those components are cancelled from the signal at A. This reduces the effect of that interferer on the signal that is passed to the mixer 15, which reduces the tendency of that mixer to saturate due to the presence of the interferer in the originally received signal.

The signal at E that is generated by the filter circuit is formed from the received radio frequency signal. In the example of FIG. 2 it is formed only by frequency conversion and filtering of the received radio frequency signal. This means that it can be formed by means of relatively simple circuitry. Additional processes could be performed in the filter. For example, the filter could amplify the signal at a point as it passes through the loop in the filter. In a simple implementation the low pass filter is actually an integrator with id gain=1/f. The gain of the filter loop ($G_{loop}$) is then very high at DC and decays as 1/f with increasing frequency.

Figure 3:
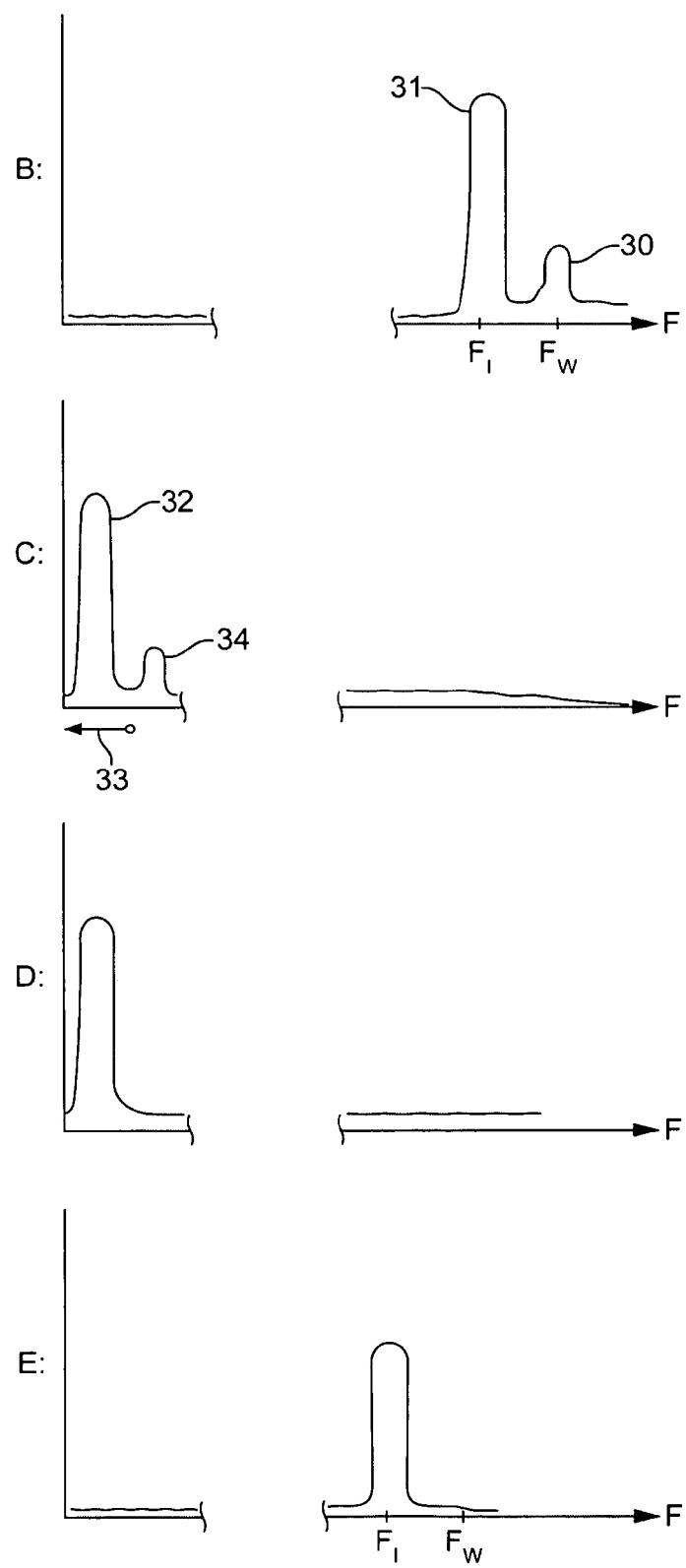
FIG. 3 shows frequency components of signals in the receiver of FIG. 2.

FIG. 3 illustrates in frequency space components of the signals at points B to E. The signal at B includes a wanted signal 30 at $f_W$ and an interferer 31 at $f_I$. $f_{LO2}$ is set to roughly $f_I$ so that in the signal at C the components 32 due to the interferer are shifted to within the passband 33 of the filter 21. The components 34 due to the wanted signal are outside the passband 33. The output D of the filter 21 includes only those components of the signal at C that fell within the passband 33. Finally, the signal at E includes those same components frequency shifted back to their original frequencies, as in signal B. Subtraction of this signal E from the signal at A will result in subsequent cancellation of the interferer 31 from the signal at B.

Specifically, after the first mixing stage the wanted signal gives rise to components at ($f_W+f_{LO2}$) and ($f_W-f_{LO2}$), and the interferer gives rise to components at ($f_I+f_{LO2}$) and ($f_I-f_{LO2}$). ($f_W+f_{LO2}$) and ($f_I+f_{LO2}$) are high frequencies. $f_{LO2}$ is selected such that ($f_I-f_{LO2}$) is within the passband 33 of the low-pass filter 21. Preferably $f_{LO2}$ is selected such that ($f_w-f_{LO2}$) is outside the passband 33 of the low-pass filter 21, so that the wanted signal will still be passed to the mixer 15, but this is not essential at all times because the interferer could be short-lived and because the wanted signal could be part of a spread-spectrum signal that has other wanted components at other frequencies. Mixing of the component at ($f_I-f_{LO2}$), which is passed by the filter 21, with the output of LO 16 results in components at $f_I$ and ($f_I-2f_{LO2}$). ($f_I-2f_{LO2}$) is a high frequency. $f_I$ is the frequency of the original interferer.

The extent to which the interferer is cancelled from the received signal depends on the gain of the filter loop. If the gain of the filter loop is $G_{loop}$, the level of the interferer at A is $i_A$ and the level of the interferer at B is $i_B$ then $i_B=i_A-G_{loop}*i_A$, so $i_B=i_A/(1+G_{loop})$. Thus the interferer is attenuated by $(1+G_{loop})$, which approximates to $G_{loop}$ when $G_{loop}$ is high.

The design of the filter circuit means that the local oscillator 23 and the low-pass filter 21 can have relatively relaxed tolerances, allowing them to be implemented readily and to occupy relatively little circuit area. The low-pass filter loop can perform as a single integrator with gain set such that the closed loop gain (i.e. $G_{downmixer}+G_{integrator}+G_{upmixer}$) is equal to or approximately equal to zero dB at a few MHz. Setting the integrator gain varies the width of the notch accordingly: e.g. a gain of +6 dB doubles the bandwidth of the notch. The bandwidth of the low-pass filter defines the width of the notch at RF that results from subtraction of the output of the signal at E, and its gain defines how deep that notch will be. It should be noted that since it is at low frequency that the low-pass filter isolates the components that are to be subtracted from the received signal, the notch can be synthesized without stability issues and at frequencies around any frequency that is in the operating range of the LO 23.

Suitable widths of the passband could (for instance) be less than 50 MHz or less than 10 MHz, and optionally greater than 3 MHz.

When the low-pass filter has a passband 33 of a significant bandwidth, $f_{LO2}$ need not be exactly the same as $f_I$. Even if $f_{LO2}$ is only roughly the same as $f_I$, the frequency-shifted interferer can still fall within the passband of the low-pass filter 21 since that passband has a finite width. Similarly, the local oscillator 23 need not be capable of being locked precisely to a certain frequency, because even with frequency drift of $f_{LO2}$ the passband of the low-pass filter can accommodate frequency drift of the frequency-shifted interferer. Similarly, there is no severe constraint on the oscillator's phase noise. If the LO signals as supplied to the first and second mixing stages are matched in phase, which can be achieved through the design of the circuit paths from the LO 23 to those mixers, then there is no problem if the LO drifts in phase. Alternatively, the signal between the mixers could be phase-shifted to compensate for a difference in the phase of the LO signals as applied to the mixers. The oscillator 23 is conveniently a voltage controlled oscillator (VCO). It could be implemented as a ring oscillator, any other suitable simple oscillator or by a more complex design. stability issue as long as the LO signal of both down and up notch converters are matched in phase which can easily be achieved through good layout matching.

The filter circuit 14 could be active all the time. More preferably, it is activated only when the received signal meets one or more predetermined criteria that are indicative of the presence of an interferer. Such criteria are preferably dependent on the signal output from the LNA 13, for example and could, for example, include the amplitude of the signal at the output of the LNA 13 exceeding a predetermined threshold. Detecting the interferer at the output of the LNA has the advantage that its compression level can better be established there than later in the receive path. The interferer could be detected by sensing circuitry at any suitable point in the receive chain: at radio frequency, at intermediate frequency or at baseband, and in analogue or digital. In one preferred embodiment the interferer is detected by sensing circuitry 24 in dependence on the signal at A, i.e. at the output of the amplifier 13. Circuitry 24 could comprise a frequency counter which is activated when an interferer is detected (e.g. by the amplitude of the LNA's output exceeding a threshold). The frequency counter gives the average frequency of the interferer. This information is used to lock the auxiliary VCO 23 of the notch circuit. In another preferred embodiment the interferer is detected by sensing circuitry in baseband 18, in dependence on the digitally sampled values of the downconverted received signal. The sensing circuit could be implemented by dedicated components, or by a digital signal processor. When no interferer is detected by the sensing circuitry the filter circuit can be inactive, saving power. In this implementation the filter block uses no power when there is no interferer present. When an interferer is detected at a particular frequency, the sensing circuitry activates the filter circuit and sets the local oscillator 23 to run at roughly the frequency of the detected interferer.

Once the filter has been activated in response to the detection of an interferer, it is advantageous for the receiver to be able to deactivate the filter in order to reduce power consumption (e.g. by switching off the oscillator 23) and so that the receiver can then re-deploy the filter at another frequency to block another interferer. The receiver could automatically deactivate the filter after a predetermined time. If the interferer was still present it would then be re-detected and the filter could be reactivated. More preferably, the receiver can detect when the interferer has gone, and can deactivate the filter loop in response to that event. One way of doing that is by means of detection circuitry that is responsive to the output of the LNA. More preferably, a signal strength detector 25 is responsive to the signal D at the output of the filter 21 and detects the power or amplitude of that signal. If the detected signal strength exceeds a predetermined threshold then an interferer is assumed to be present in the band to which the filter is tuned. Otherwise, it is assumed that the interferer is no longer present in the band to which the filter is tuned, and so if the detected signal strength is below the predetermined threshold then the detector causes the filter loop to be deactivated. The detector 25 could be responsive to a signal elsewhere in the filter loop, but it is preferred that it detects the signal at D because since that signal is at baseband the detector 25 can be implemented simply.

To cope with multiple interferers at different frequencies the receiver could have multiple implementations of the filter circuit 14 in parallel with each other. The local oscillator of each implementation of the filter could be set in response to the sensing circuit to an appropriate value so as to null a respective interferer.

It should be noted that, in contrast to some other ways of improving immunity to interferers, in the system described herein the input matching of the LNA 13 is not affected. The present system simply reduces the amplitude of the unwanted interferer in the signal at the input of the main receive mixer 15. In that way the compression bottleneck of the receive chain can be relieved and in the presence of an interferer a greater level of amplification can be applied by the LNA 13 before the mixer 15 saturates.

In FIG. 2 mixing stages 15, 20 and 22 are illustrated by single mixers. In each case, the respective mixing stage could be implemented by a pair of mixers, one operating for 1 (in-phase) signal and the other for Q (quadrature) signal. In the case of mixing stage 15, this could be done by (a) the signal at B being split and input to each of the I and Q mixers in stage 15; (b) the output of the local oscillator 16 being split, with one branch passing through a 90° phase shifter before reaching the respective mixer; and (c) the outputs of the mixers passing in separate I and Q paths to a pair of A-to-D converters. In the case of mixing stages 20 and 22, this could be done by (a) the signal at B being split and input to each of the I and Q mixers in stage 20; (b) the output of the local oscillator 23 being split, with one branch passing through a 90° phase shifter before reaching one of the mixers in stage 20 and one of the mixers in stage 22; (c) the output of the I mixer in stage 20 passing through a first implementation of the low-pass filter 21 and then to the I mixer in stage 22 whilst the output of the Q mixer in stage 20 passes through a second implementation of the low-pass filter 21 and then to the Q mixer in stage 22; and (d) the outputs of the I and Q mixers in stage 22 being combined to form the signal at E.

The receiver, including the filter loop but with or without the antenna, may be entirely implemented on a single integrated circuit. The receiver may be a receiver for a wide bandwidth protocol such as UWB.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A filter for filtering a received signal from an amplifier, in order to attenuate an interferer therein, the interferer having a component at an interferer frequency, and the filter comprising:
   an intermediate filter providing a passband and a stopband;
   a first frequency converter configured to form a first intermediate signal by frequency-shifting an input signal derived from the received signal such that a component of the input signal at the interferer frequency is shifted to a frequency in the passband of the intermediate filter, and to input the first intermediate signal to the intermediate filter so as to cause the first intermediate signal to be filtered by the intermediate filter to form a second intermediate signal;
   a second frequency converter configured to form a cancellation signal by frequency-shifting the second intermediate signal such that a component of the second intermediate signal in the passband of the intermediate filter is shifted to the interferer frequency;
   a cancellation unit configured to cancel the cancellation signal from the received signal to attenuate the interferer therein; and
   a signal strength detector configured to detect the strength of a signal at the output of the intermediate filter and to, if the detected strength is below a predetermined threshold, deactivate the filter;
   wherein the interferer frequency is detected in dependence on said received signal at the output of said amplifier.

2. A filter as claimed in claim 1, wherein the passband is lower in frequency than the interferer frequency.

3. A filter as claimed in claim 1, wherein the upper limit of the passband is less than 50 MHz.

4. A filter as claimed in claim 1, wherein the intermediate filter is a low-pass filter.

5. A filter as claimed in claim 1, wherein the filter comprises a local oscillator for generating a mixing signal, the first frequency converter comprises a mixer configured to mix the mixing signal with the input signal to form the first intermediate signal and the second frequency converter comprises a mixer configured to mix the mixing signal with the second intermediate signal to form the cancellation signal.

6. A filter as claimed in claim 5, wherein the oscillator is a ring oscillator.

7. A filter as claimed in claim 1, wherein the cancellation unit is configured to linearly combine the received signal and the cancellation signal.

8. A filter as claimed in claim 1, wherein the interferer frequency is at radio frequency.

9. A signal receiver comprising:
   an amplifier for amplifying an incoming signal to form a received signal;
   a filter as claimed in claim 1 configured to filter the received signal to attenuate an interferer therein; and
   a downconverter for downconverting the filtered received signal.

10. A signal receiver as claimed in claim 9, wherein the downconverter is a mixer.

11. A signal receiver as claimed in claim 9, comprising:
    a detector for detecting an interferer in the received signal and activating the filter if an interferer is detected.

12. A method for notch filtering a received signal from an amplifier, in order to attenuate an interferer therein, the interferer having a component at an interferer frequency, the method comprising:
    synthesising a cancellation signal by frequency-shifting an input signal derived from the received signal in such a way as to shift a component of the input signal at the interferer frequency to a frequency in the passband of an intermediate filter, thereby forming a first intermediate signal, filtering the first intermediate signal by means of the intermediate filter to form a second intermediate signal and forming the cancellation signal by frequency-shifting the second intermediate signal such that a component of the second intermediate signal in the passband of the intermediate filter is shifted to the interferer frequency;
    cancelling the cancellation signal from the received signal to attenuate the interferer therein; and
    detecting the strength of a signal at the output of the intermediate filter and, if the detected strength is below a predetermined threshold, deactivating the filter;
    wherein the interferer frequency is detected in dependence on said received signal at the output of said amplifier.

* * * * *